United States Patent [19]
Baxter

[11] Patent Number: 5,114,178
[45] Date of Patent: May 19, 1992

[54] SUSPENSION APPARATUS

[76] Inventor: David A. Baxter, Rt. #1, Box 71, Warrenton, Mo. 63383

[21] Appl. No.: 596,556

[22] Filed: Oct. 11, 1990

Related U.S. Application Data

[63] Continuation of Ser. No. 322,530, Mar. 13, 1989, abandoned.

[51] Int. Cl.⁵ ............................................. B60G 11/22
[52] U.S. Cl. ..................................... 280/716; 267/292
[58] Field of Search .............. 280/716, 711, 713, 688; 267/292, 153, 257, 228

[56] References Cited

U.S. PATENT DOCUMENTS

| | | | |
|---|---|---|---|
| 2,971,771 | 2/1961 | Jewell | 280/716 |
| 3,120,952 | 2/1964 | Hendrickson | 280/716 |
| 3,215,384 | 11/1965 | Chambers | 280/716 |
| 3,220,746 | 11/1965 | Francis | 280/716 |
| 3,481,623 | 12/1969 | Campbell | 280/716 |
| 3,671,057 | 6/1972 | Cheers | 280/716 |
| 3,713,666 | 1/1973 | Cheers et al. | 280/716 |
| 4,053,148 | 10/1977 | Chalmers | 267/292 |
| 4,140,304 | 2/1979 | Ghrist | 280/716 |
| 4,596,402 | 6/1986 | Raidel | 280/711 |

FOREIGN PATENT DOCUMENTS

| | | | |
|---|---|---|---|
| 53549 | 7/1967 | Poland | 267/292 |
| 243079 | 11/1925 | United Kingdom | 267/292 |

Primary Examiner—Charles A. Marmor
Assistant Examiner—Karin Tyson
Attorney, Agent, or Firm—Edward H. Renner

[57] ABSTRACT

A suspension assembly for vehicles has an elastomeric spring contained in a rigid, telescoping housing and a torque arm. The spring resists and transmits vertical forces, the torque arm resists and transmits longitudinal forces and the rigid housing resists and transmits transverse or side forces.

20 Claims, 2 Drawing Sheets

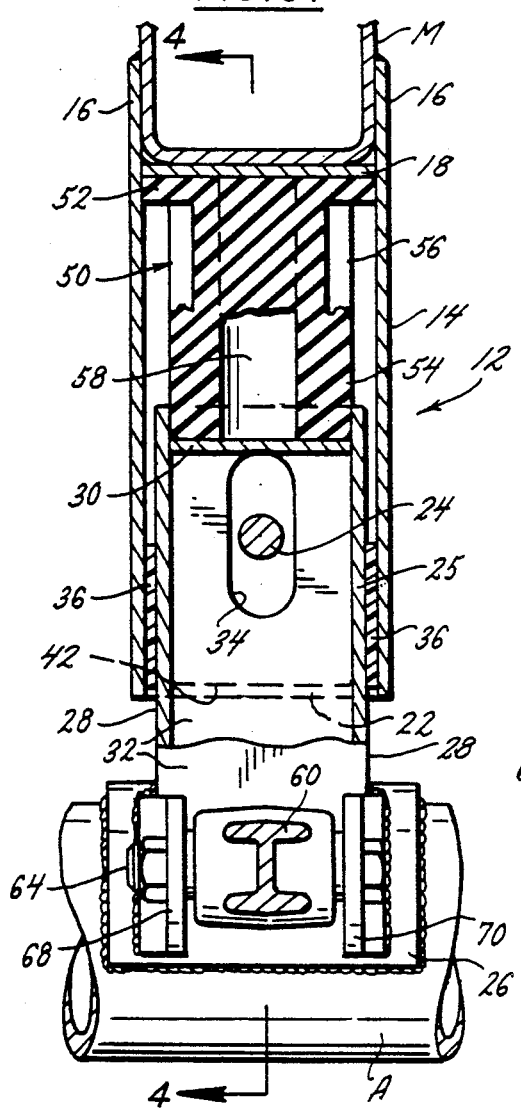
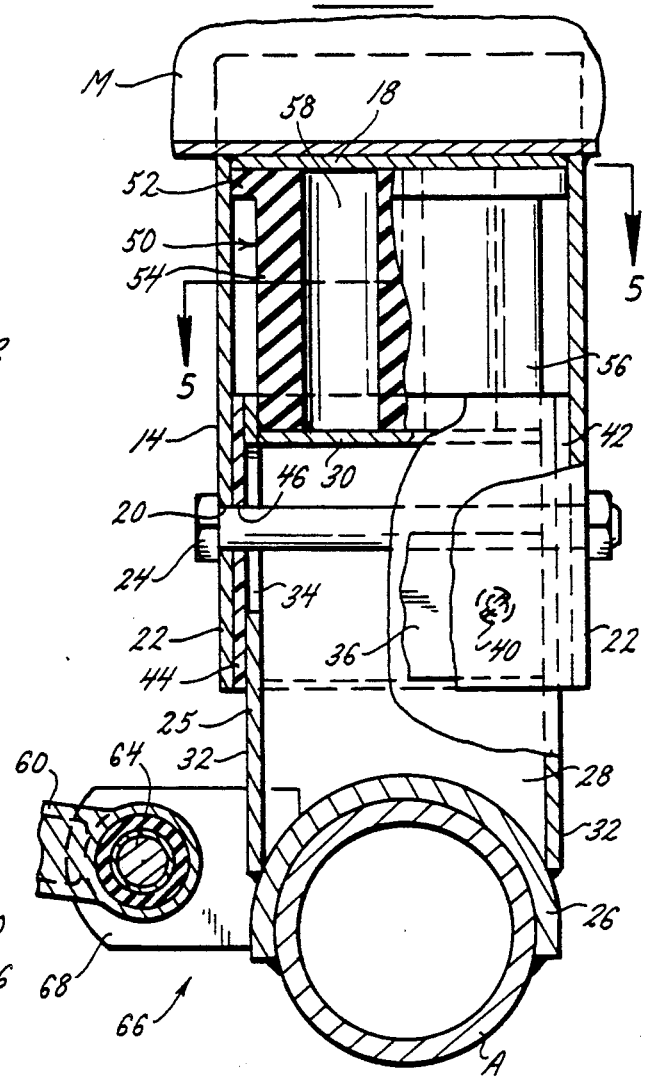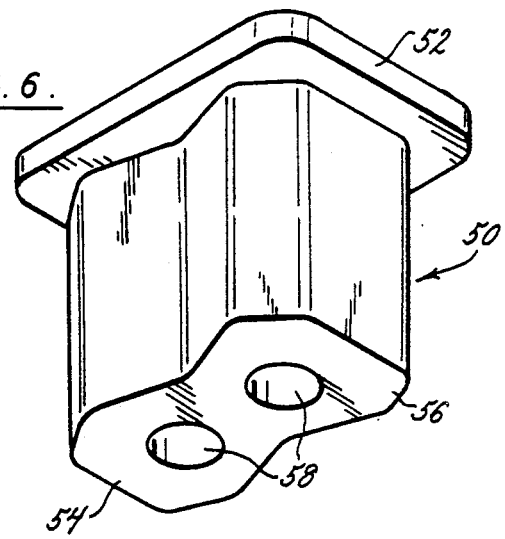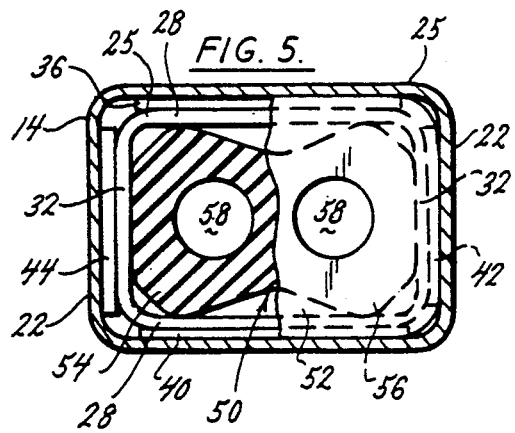

SUSPENSION APPARATUS

This is a continuation of copending application(s) Ser. No. 07/322,530 filed on Mar. 13, 1989 now abandoned.

BACKGROUND AND SUMMARY OF THE INVENTION

This invention relates to suspension assemblies for vehicles and in particular to suspension systems for trailers, light trucks, over-the-road trucks and other utility vehicles.

Utility vehicles have a number of uses particularily in hauling special loads such as boats, and general loads such as freight beds or containers. Over time a number of suspension systems have been developed for trailers and light trucks and other vehicles. The more common types include leaf springs and coil springs. More recently elastomeric springs of the block or biscuit type have been used as well as pneumatic springs. An example of the block or biscuit type of spring is shown in U.S. Pat. No. 3,481,623. There the spring is a block of elastomeric material mounted between the axle and the bed of the trailer. An example of an air spring suspension assembly may be seen in U.S. Pat. No. 3,794,344.

While conventional suspension systems as those described above do work, they may have certain drawbacks. Specifically the spring elements are exposed to rocks and other debris thrown up from the road, which over time will cause the spring either to fail, or not to function properly, and require replacement. Many older designs had stability problems during cornering and are susceptible to road sway as well as to damage. Many conventional systems are mechanically complex and are thus very expensive to produce and maintain and are not suitable for light vehicle use where expense is a serious design consideration.

Applicant has developed a suspension which is an inexpensive design, which readily fits trailers and other utility vehicles such as trucks. It may be easily sized to fit small, light trailer and trucks but it may also be sized for large, heavy load vehicles. Applicant's system is designed to utilize a small number of parts, to be rugged in construction, to provide protection for the spring assemblies and to provide an inexpensive method of transmitting side forces between the suspension assembly and the trailer or vehicle structure itself. This is of particular value in reducing side sway from side loads imposed by cornering. Applicant's assembly is easily manufactured. It may be installed on vehicles as original equipment or retrofitted to existing vehicles, and in particular it may be installed in a variety of configurations including being mounted directly under frame members or either inboard or outboard frame members on a vehicle. Applicant's suspension assembly is provided with a variety of structures for assisting in the long life of the assembly and durability of the assembly, including provision for special reinforcing and wear structures to protect the load bearing part of the assembly from wear.

Applicant is aware of the following U.S. Patents, the disclosures of which are incorporated by reference herein:

RE: 28,259
1,445,669
2,045,028
2,787,459
3,220,746
3,410,573
3,481,623
3,794,344

Among the objects of the present invention is the provision of a suspension apparatus for vehicles utilizing a protected elastomeric spring to prevent spring failure due to damage from wear and debris.

It is a further object of applicant's invention to provide a suspension apparatus which reduces vehicle breakage and increases longevity of the apparatus.

It is an object of applicant's invention to provide a low maintenance suspension assembly with wear reducing means including stop plates and wear plates.

It is an object of applicant's invention to provide an easily assembled and installed suspension system.

It is an object of applicant's invention to provide an inexpensive suspension assembly which is readily installed as original equipment or retrofitted to existing vehicles.

It is an object of applicant's invention to provide a suspension assembly which may be conveniently adapted to a number of mounting configurations.

It is an object of applicant's invention to provide an inexpensive weight saving suspension assembly having means to take up side loads imposed on the suspension assembly.

Other objects and features of applicant's invention will be apparent from the following description of the drawings and description of the preferred embodiment.

BRIEF DESCRIPTION OF THE DRAWINGS

FIG. 3 is a rear elevational view, in section, taken along line 3—3 in FIG. 1'

FIG. 4 is a side elevational view, in section, taken along line 4—4 in FIG. 3;

FIG. 5 is a top plan view, partly in section, of an elastomeric spring and taken along line 5—5 in FIG. 4;

FIG. 6 is a perspective view of the elastomeric spring; and,

Corresponding reference characters indicate corresponding parts throughout the several view of the drawings.

DESCRIPTION OF THE PREFERRED EMBODIMENTS

Figure 1:
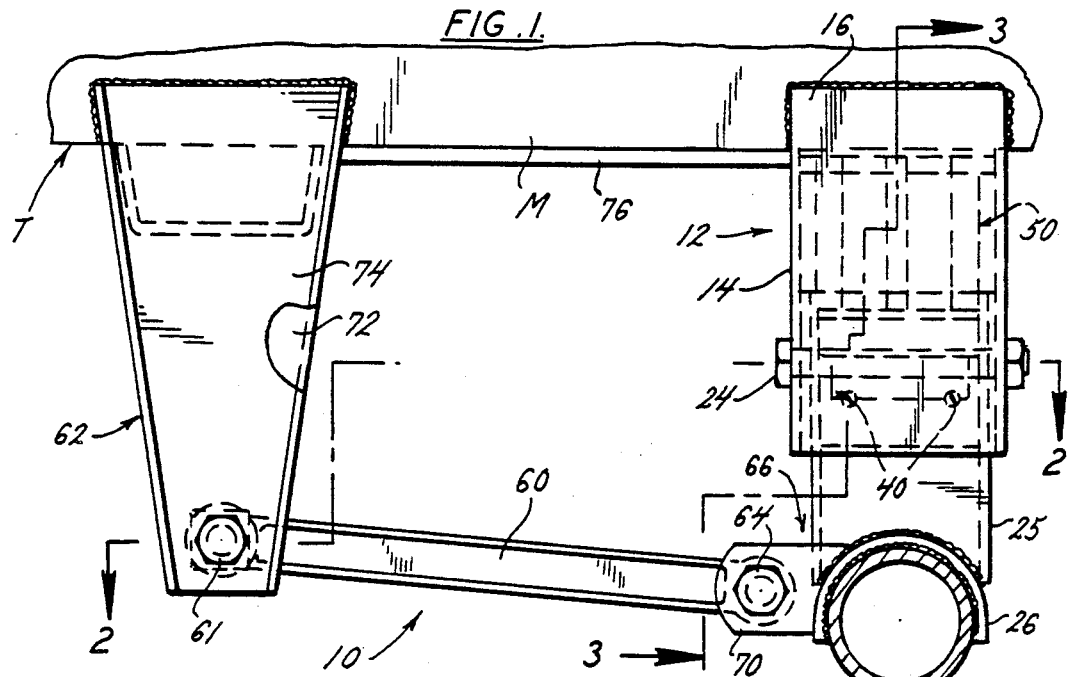
FIG. 1 is a side elevational view of a suspension apparatus of the present invention.

Referring to the drawings, apparatus of the present invention, which is for a suspension system, is indicated generally 10. The apparatus is useful with a trailer having an axle A positioned beneath a trailer frame member M. While the apparatus as described herein is for a single axle, it will be understood that the apparatus may also be used with multi-axle trailers.

Figure 2:
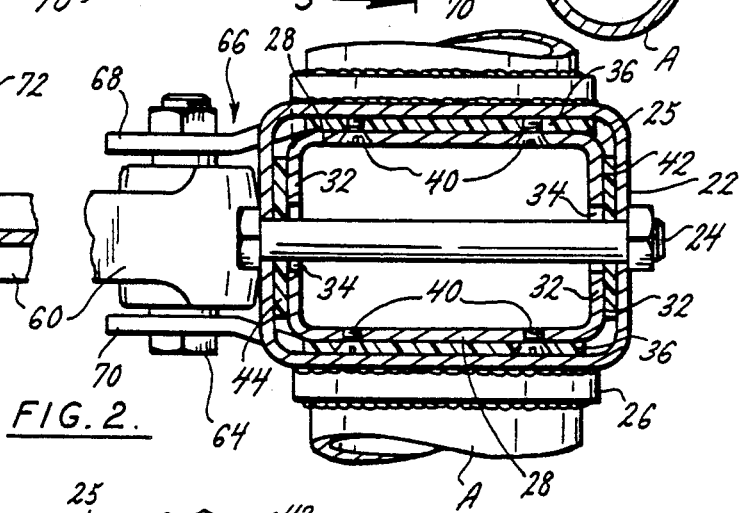
FIG. 2 is a top plan sectional view taken along line 2—2 in FIG. 1.
Figure 7:
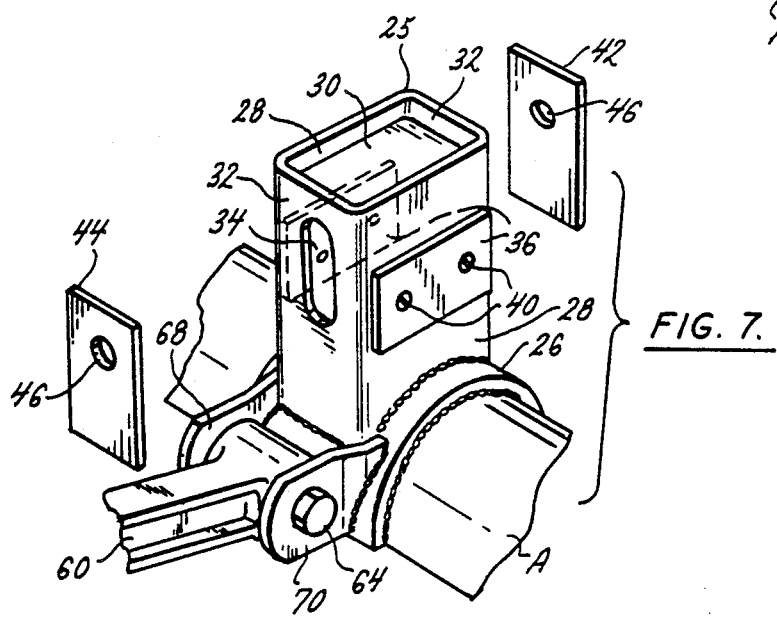
FIG. 7 is a perspective view of a housing section and torque arm bracket showing the attachment therof to an axle.

Suspension 10 first includes a housing 12 installable between axle A and frame member M. Housing 12 has a first housing section 14 which is rectangular in cross-section (see FIGS. 2 and 5) and which is attachable to the frame member M. Housing section 14 is hollow and has an upper extension 16 which is U-shaped (for rectangular frame members) but may be of semi-circular or other shapes, e.g., for rounded frame members. The upper extension 16 may be fitted against the underside of the frame member M at a convenient location directly above axle A, as shown. The housing section 14 is attached to the frame member M by any suitable means; as for example, by welding extension 16 to the underside of the frame member M, as shown. A rectangular, flat plate 18 is fitted inside section 14 to form an abutment as will be described hereinafter. The plate is installed transverse to the longitudinal axis of housing section 14 and is installed so as to be immediately beneath frame member M upon attachment of the housing section to the frame member. It will be appreciated that the suspension 10 may also be mounted inboard or outboard of frame member M.

Housing section 14 is typically installed with the longer side of the section transverse to the axle A. Bolt holes 20 are formed in opposite end walls 22 of the section 14 for a bolt 24 to be inserted through the section 14. It will be understood that more than one set of bolt holes 20 may be formed in the end walls 22. The purpose for the bolt 24 will be described hereinafter. The position of the bolt holes 20 is between the middle and lower end of housing section 14.

Housing 12 next includes a lower housing section 25 which is attachable to axle A. Section 25 is shown as being rectangular in cross-section, but may have other cross-sections, to conform to the cross-section of housing section 14. For example, sections 14 and 25 could be round or square in cross-section. The outer length and width dimensions of the section 25 are smaller than the inner length and width dimensions of housing section 14. This permits housing section 25 to be telescopingly received in section 14. Section 25 has a lower extension 26 which has side walls 28 that are concave at their bottom end for the extension 26 to fit over axle A. The extension 26 is attached to the axle A by any suitable means; again, for example, by welding. It will be understood that the extension 26 may be a cylinder split lengthwise with the outer face of the cylinder being secured to the side walls 28 of section 25 and the inner face of the cylinder fitting over the axle. Section 25, extension 26 and bracket 66 (described herein) may be formed by welding, may be cast as a unitary part, or formed by other conventional means. The housing section 25 is installed on the axle A at a point immediately below the point on the frame member M where housing section 14 is installed. This is done to permit section 25 to be received in section 14.

A flat, rectangular plate 30 is installed across the upper end of housing section 25, as shown in FIGS. 3 and 4, at a point slightly below the upper end of the housing section 25. The plate 30 may be placed at the top of section 25, if desired. The housing section 25 has end walls 32 corresponding to end walls 22 of housing section 14. Vertical slots 34 are formed in these end walls 32 for the bolt 24 to pass through the housing section 25. Bolt 24 acts as a stop or travel limiter to restrict the travel of housing sections 14 and 25 to prevent separation thereof. It will be appreciated that other travel limiting structures may be used, e.g., a vertically extending bolt or a strap restricting the travel of axle A.

Rectangular shaped wear plates 36 are secured to side walls 28 of the housing section 25 by attaching screws 40. Two additional wear plates 42 and 44 are interjoined between the respective end walls 22,32 of the housing sections 14,25 as shown. Each wear plate 42,44 has an opening 46 corresponding in size to the diameter of bolt 24 for the bolt 24 to extend through the wear plates 42,44 upon insertion through the housing sections 14,25.

A nut 48 is screwed onto the threaded end of bolt 24 to capture the bolt 24 and permit movement of housing section 25 within section 14 to the extent of the length of slot 34.

Suspension 10 also includes a spring means 50 which is positioned within housing 12. Spring 50 is preferably a block or "biscuit" of elastomeric material. As shown in FIG. 5, spring 50 has a flat, rectangular head portion 52 which is sized to be received within housing section 14. The upper face of head 52 bears against or abuts the underside of plate 18. If an elastomeric spring 50 is used, its design may include the self dampening or shock absorbing characteristic of such materials and additional shock absorbing structure may not be needed. Conventional shock absorbers, not shown, may be used if desired.

Spring 50 further includes a pair of generally hexagonally shaped spring elements 54 and 56 which depend from the underside of spring head 52. Spring elements 54 and 56 are adjacent each, and may be integrally formed, as shown, together with head 52, so as to have a common interface. The spring elements may have uniform dimensions along their length, the overall length and width of the combined elements permitting the lower end of the element to fit into the upper end of housing section 25 or to abut against the upper face of plate 30.

As a vehicle or trailer moves over a road, bumps and vibrations are transmitted through the wheel assemblies (not shown) to axle A. Movement of the axle causes movement of housing section 25 within section 14 and as section 25 telescopes into section 14 spring 50 is compressed with the hexagonal spring elements 54 and 56 being deformed. This deformation absorbs the energy of the shocks which otherwise is transmitted to frame member M. To facilitate this deformation, each spring element 54 and 56 has a longitudinal central bore 58 which extends substantially the length of the spring element 54 or 56. The resiliency characteristics of the elastomeric material forming spring 50, conventional spring rubber or polymer compounds, are such that the spring 50 quickly returns to its initial shape to be ready to absorb the next shock transmitted through axle A. Cross sections of spring 50 and spring elements 54, 56, other than those shown, may be used, for example, cylindrical.

Suspension 10 additionally includes torque arm 60 which is also installable between axle A and frame member M, as shown. Torque arm 60 transmits longitudinal load between the axle and the vehicle, such as braking and towing loads. Torque arm 60 may be pivotally mounted, at 61, to a box mount 62 attached to frame member M, as shown. Torque arm 60 may also be pivotally mounted, at 64, to axle A, as shown. Other locations on axle A could be used, for example, under axle A. Torque arm 60 may be mounted in either the leading or trailing configuration.

A bracket 66 is affixed to the lower end of extension 26 of housing section 25. Bracket 66 comprises a pair of spaced-apart rearwardly extending ears, 68 and 70. The spacing between the ears 68 and 70 accomodates mount 64 of the torque arm 60 between them, as shown.

Box mount 62 may be formed of spaced-apart hangars, 72 and 74 respectively have their upper end attached to frame member M; as, for example, by welding. Each hangar tapers along its length with the narrower, lower end of each hangar ending at a point slightly above and in front of the center line of axle A.

The hangars 72 and 74 are spaced apart a distance to accomodate the mount 61 of the torque arm 60 between them.

In operation, vertical load between the axle A and the frame member M is taken up by compression of the spring 50, and deformation thereof, as described. Longitudinal load is taken up primarily by torque arm 60, as noted above. However, the side load between frame member M and axle A is primarily transmitted by housing 12. Housing sections 14 and 25 are formed of very rigid, stiff metal members, such as high strength steel, and have wear plates 36, 42, 44 noted above. The wear plates may be of conventional friction resistant material, such as brake lining material, and can be formed in one piece or a plurality of pieces, as shown. The sections 14 and 25 of housing 12, with wear plates 36, 42 and 44 are placed closely adjacent so that side thrust from side loads is transmitted primarily through housing 12. This construction permits a suspension which is inexpensive and simple to manufacture. The structure does not require other elements to take up side load and does not require reinforcement of the other elements to withstand side load.

In a one configuration, the entire suspension assembly 10 can be fabricated as a unit, including a joining member 76 connecting box member 62 and housing 12, as shown in FIG. 1. The single unit construction simplifies installation of a complete suspension assembly 10. Alternatively, the suspension assembly 10 can be installed on a frame member M, element by element.

What has been described is an inexpensive suspension system that reduces road shocks and trailer sway; while at the same time being easy to install and service.

It will be appreciated that various modifications may be made to the structure described herein without departing from the invention. Applicant is not to be limited by the specific embodiments described herein for purposes of illustration, but is to be limited only by the claims appended hereto and their equivalents.

We claim:

1. A suspension apparatus for a vehicle having an axle positioned beneath a frame member comprising: a housing means installable between the axle and a frame member, the housing having a first rigid section rigidly attachable to a frame member above the axle and a second rigid section rigidly attachable to an axle member, and the first section and the second section including means telescopically joining the first section and the second section for sliding, telescoping movement of one section within the other section; a plate across the internal end of the inner section, a spring means positioned within the outer section in the form of a resilient spring adapted to be compressed by the plate as the housing sections telescope together, and a housing section travel limiter adapted to restrict travel of the housing sections so that on compression of the spring the outer housing section does not strike the member to which the inner housing section is attached, to restrict travel of the housing sections on spring decompression, and to prevent separation of the housing sections, the rigid housing sections forming means for transmitting side loads between the housing sections and between the axle and a vehicle frame.

2. The apparatus of claim 1 wherein the resilient spring comprises an elastomeric spring, the spring means including means for dampening road shocks otherwise transmitted through the axle to the frame member.

3. The apparatus of claim 2 wherein the first housing section is rectangular in cross-section and the spring has a flat head portion rectangularly shaped and sized to be received within the first housing section.

4. The apparatus of claim 3 wherein the first housing section has an internal plate across its upper end against which the spring head abuts.

5. The suspension apparatus of claim 1 wherein the outer housing section is attached to the frame member and the inner housing section is attached to the axle member.

6. The suspension apparatus of claim 5 wherein a torque arm means is installed between the axle and the frame member for transmitting longitudinal loads between the suspension and a trailer mounted thereon.

7. A suspension apparatus for a vehicle having an axle positioned beneath a frame member comprising:
rigid housing means installable between the axle and a frame member, the housing having a first second attachable to a frame member and a second section attachable to the axle and telescopically received in the first section, the housing means including means for transmitting side loads between the axle and a vehicle frame;
spring means positioned within the housing and including a resilient spring movable by the housing sections as they telescope together, and
the resilient spring having an elastomeric spring, the spring means including means for dampening road shocks otherwise transmitted through the axle to the frame member,
the first housing section being rectangular in cross-section and the springs having a flat head portion rectangularly shaped and sized to be received within the first housing section.
the spring further including a pair of generally hexagonally shaped spring elements depending from the underside of the head, and
torque arm means installable between the axle and the frame member for transmitting longitudinal loads between the suspension and a trailer mounted thereon.

8. The apparatus of claim 7 wherein the spring elements are adjacent each and integrally formed to have a common interface.

9. The apparatus of claim 8 wherein each spring element has a central, longitudinal bore extending the length of the element, the bore aiding the resiliency of the element.

10. The apparatus of claim 7 wherein the second housing section is rectangular in cross-section and has a plate at its upper end on which the spring elements seat.

11. The apparatus of claim 10 further including corresponding vertical slots formed in opposed walls of the second housing section, the housing means including bolt means extending through the slots and openings in the adjacent walls of the first housing section to limit vertical movement of the second section.

12. The apparatus of claim 10 wherein the housing means further includes first and second wear plates interposed between the first and second housing section on opposite sides thereof.

13. The apparatus of claim 11 further including third and fourth wear plates interposed between the first and second housing sections on the other two sides thereof.

14. The apparatus of claim 13 wherein the torque means includes a bracket attachable to the axle and means for rotatably connecting one end of the torque arm to the bracket.

15. The apparatus of claim 14 wherein the torque means includes means for rotatably connecting the other end of the torque arm to the hangar means.

16. The apparatus of claim 15 wherein the hanger and the housing are connected by a joining member, the joining member maintaining the suspension apparatus as a unitary structure and facilitating installation of the apparatus.

17. A suspension assembly for load carrying vehicles having an axle and a frame member, comprising a first rigid housing member, the first rigid housing member including means for attaching to a vehicle frame, and a second rigid housing member, the second rigid housing member including means for attaching to a vehicle axle, the first and second housing members including means for telescoping engagement and movement, the first and second housing members further including means for receiving a spring means therein, the spring means including means for resiliently bearing vertical loads and transmitting vertical loads between an axle and a frame of a vehicle on which the suspension assembly is mounted, the spring means including means for damping motion between the first and second housing members, the suspension assembly including a hanger, the hanger including means for attaching to a vehicle frame at a location spaced from the first housing member, the hanger including means for pivotally attaching a torque arm thereon, the second housing member also including means for pivotally attaching a torque arm thereon, a torque arm pivotally connected to the hanger and pivotally connected to the second housing member, the torque arm bearing and transmitting longitudinal loads between a vehicle frame and an axle on which the suspension assembly is mounted, the first and second housing means including means for bearing and transmitting transverse loads between a vehicle frame and an axle on which the suspension assembly is mounted.

18. The suspension assembly of claim 17 wherein the hanger and the first housing member are connected by a joining member, the joining member including means for maintaining the suspension assembly as a unitary structure and facilitating installation of the suspension assembly on a vehicle.

19. The suspension assembly of claim 17 wherein the first and second housing members are high strength steel.

20. The suspension assembly of claim 16 wherein the first and second housing members have first and second abutment means respectively, the abutment means including means for confining the spring means therebetween, the spring means including an elastomeric spring having a flat head portion shaped and sized to be received in the first housing member adjacent to the first abutment means, the elastomeric spring having a depending spring element sized to be received in the second housing member adjacent to the second abutment means, the elastomeric spring including means for increasing the resiliency of the elastomeric spring, the suspension assembly including means for resisting wear from frictional engagement between the first and second housing members, the suspension assembly further including means for limiting the telescoping travel of the first and second housing members.

* * * * *